United States Patent
Shanmuganathan et al.

(10) Patent No.: US 11,427,651 B2
(45) Date of Patent: Aug. 30, 2022

(54) PROCESS FOR THE PREPARATION OF ESSENTIAL OILS MODIFIED NANOCELLULOSE AND APPLICATION THEREOF

(71) Applicant: COUNCIL OF SCIENTIFIC AND INDUSTRIAL RESEARCH, New Delhi (IN)

(72) Inventors: Kadhiravan Shanmuganathan, Pune (IN); Prashant Yadav, Pune (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 17/052,187

(22) PCT Filed: May 2, 2019

(86) PCT No.: PCT/IN2019/050350
§ 371 (c)(1),
(2) Date: Oct. 31, 2020

(87) PCT Pub. No.: WO2019/211871
PCT Pub. Date: Nov. 7, 2019

(65) Prior Publication Data
US 2021/0054104 A1 Feb. 25, 2021

(30) Foreign Application Priority Data

May 2, 2018 (IN) .............................. 201811016541

(51) Int. Cl.
*C08B 15/00* (2006.01)
*A23P 20/10* (2016.01)

(52) U.S. Cl.
CPC ............ *C08B 15/00* (2013.01); *A23P 20/105* (2016.08)

(58) Field of Classification Search
CPC ............................... C08B 15/00; A23P 20/105
See application file for complete search history.

(56) References Cited

U.S. PATENT DOCUMENTS

| 2013/0330417 A1 | 12/2013 | Dong et al. |
| 2016/0002483 A1 | 1/2016 | Zhao et al. |
| 2016/0040363 A1 | 2/2016 | Karimi |

OTHER PUBLICATIONS

Van Zyl et al., Journal of Essential Oil Research, 2006, 18:sup1, p. 129-133. (Year: 2006).*
Certified copy of the India IN201811016541 application, available Nov. 7, 2019, accessed online at https://patentscope.wipo.int/. (Year: 2019).*
Shinoda, Ryuji, et al. "Relationship between length and degree of polymerization of TEMPO-oxidized cellulose nanofibrils." Biomacromolecules 13.3 (2012): 842-849.

* cited by examiner

*Primary Examiner* — Jonathan S Lau
(74) *Attorney, Agent, or Firm* — Blank Rome LLP

(57) ABSTRACT

The present invention provides a process for the preparation of essential oil modified nanocellulose and applications thereof. The invention further provides a process wherein the essential oil is covalently bonded with the nanocellulose such that the essential oil does not leach out. The edible coatings comprising the developed essential oil modified nanocellulose thus exhibit a prolonged antimicrobial effect.

5 Claims, 6 Drawing Sheets

Figure 1:
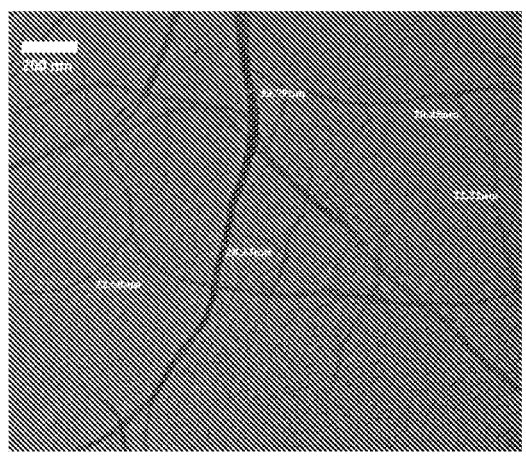

PROCESS FOR THE PREPARATION OF ESSENTIAL OILS MODIFIED NANOCELLULOSE AND APPLICATION THEREOF

CROSS REFERENCE TO RELATED APPLICATIONS

This application is a national phase of PCT application No. PCT/IN2019/050350, filed May 2, 2019, which claims priority to IN patent application No. 201811016541, filed May 2, 2018, all of which are incorporated herein by reference thereto.

FIELD OF THE INVENTION

The present invention relates to a process for the preparation of essential oil modified nanocellulose and applications thereof. In particular, the present invention relates to a process wherein the essential oil is covalently linked to the polymer, such that the essential oil does not leach out. The coatings developed in the present invention are useful for the preparation of robust transparent edible coatings which find application in multifarious industries such as paper, textiles, food products etc.

BACKGROUND AND PRIOR ART OF THE INVENTION

Infections caused by microorganisms pose a serious health hazard. Many antimicrobial formulations have been developed and applied as coatings on paper, textiles, medical dressings, food products etc. Such antimicrobial formulations typically include inorganic particles such as silver, clay, calcium carbonate etc. or organic materials such as chitosan or quaternary ammonium compounds. These antimicrobial agents are often added to the coating formulation by simple blending, which allows them to leach out during use or storage. There are some inventions which involve adding nanocomposite suspension of inorganic minerals or organic compounds to the refined paper pulp to produce antimicrobial paper.

US20160040363A1 discloses a method for producing antimicrobial paper pulp. The method includes steps of obtaining paper pulp, reducing water content and temperature of the paper pulp, and refining the paper pulp having reduced water content and temperature to improve properties of the paper pulp. The refining may be performed using a refiner with rotating and stationary cutters. The nanocomposite suspension may be added to the refined paper pulp to produce antimicrobial paper pulp. The antimicrobial paper pulp may be drained and pressed to produce paper by applying oil to reduce moisture content of the paper. The paper may be dried without using vapor.

US20130330417A1 discloses a method of forming a nanocellulose structure, comprising forming a liquid mixture of nanocellulose, wherein the nanocellulose is at least one of dispersed, suspended or gelled in the liquid mixture; drying the liquid mixture of nanocellulose to form a nanocellulose foam; and mixing at least one active ingredient into at least one of the liquid mixture of nanocellulose or the nanocellulose foam.

US20160002483A1 discloses nano-cellulose edible coatings and uses thereof. It also discloses protective coatings, particularly coatings for plants, plant parts, and foodstuffs. It further discloses compositions for forming protective films and methods of making and using these compositions and coatings. A composition, comprising: a cellulose nanomaterial in an amount ranging from about 0.02 wt/v % to about 5 wt/v %; and a surfactant in an amount ranging from about 0.01% wt/v % to about 5 wt/v %; or a cellulose nanomaterial in an amount ranging from about 0.1 wt/v % to about 1 wt/v %; and an inorganic salt component in an amount ranging from about 0.05 wt/v % to about 1 wt/v %.

The prior cite herein employs agents such as stabilizers, emulsifiers and several others to accomplish the objective of preparing cellulose compositions with various properties including edible compositions. Further, in addition most of them employ chitosan, which is reported to possess antimicrobial properties. However, being brittle, chitosan poses stability issues and is therefore unsuitable for the numerous applications envisaged.

In short it may be summarized that there is no process disclosed in the prior art where an antimicrobial essential oil is chemically [covalently] linked with nanomaterial and still demonstrates antimicrobial behavior. Further, there is no prior art which provides covalently linked nanomaterial and an antimicrobial substance wherein the antimicrobial substance does not leach out.

Therefore, the inventors of the present invention realized that there exists a dire need in the art to provide a process which comprises of judiciously modifying the functional groups in the essential oil and yet retaining its antimicrobial properties without letting it leach out after bonding with the nanomaterial.

OBJECTIVES OF THE INVENTION

The main objective of the present invention is thus to provide a process for the preparation of essential oil modified nanocellulose wherein the essential oil is covalently bonded to the nanocellulose polymer, such that the essential oil does not leach out.

Another objective of the present invention is to provide a composite for edible coatings comprising the covalently bonded essential oil and the nanocellulose polymer.

Still another objective of the present invention is to provide a process to prepare antimicrobial nanocellulose material wherein the essential oil is chemically anchored to nanocellulose.

SUMMARY OF THE INVENTION

The present invention provides a process for the preparation of essential oil modified nanocellulose comprising the steps of:
a) preparing cellulose nanofibers;
b) oxidizing cellulose nanofibers by using TEMPO mediated oxidation to afford TO-CNF;
c) preparing 4-(3-hydroxypropyl)-2-methoxyphenol from eugenol; and
d) reacting TO-CNF with 4-(3-hydroxypropyl)-2-methoxyphenol to obtain essential oil modified nanocellulose.

In a preferred embodiment, the process for preparing modified cellulose nanofibers of step (a) further comprising the steps of:
i) treating cotton rag with base preferably sodium hydroxide at a temperature of 80° C. for the time period in the range of 2 to 4 hours to form alkali treated cotton rag;
ii) subjecting bleaching treatment on cotton rag of step (i) by using acetate buffer and sodium hypochlorite or hydrogen peroxide at a temperature of 80° C. for the time period in the range of 2 hours; repeating the process for 2 to 3 times to make the fibers white and washing with distilled water until pH becomes neutral to form washed bleached pulp; and iii) grinding the pulp of step (ii) to form cellulose nanofibers (CNF).

In another preferred embodiment, oxidising cellulose nanofibers by using TEMPO mediated oxidation of step (b) further comprising the steps of:

aa) dispersing cellulose nanofibers in water, preferably deionized water to form suspension;

ba) adding 2,2,6,6 tetramethyl-1-piperidinyloxy (TEMPO), sodium bromide (NaBr) and sodium hypochlorite into suspension of step (aa), adjusting the pH of the reaction mixture 10-11 followed by stirring at a temperature of 30° C. for the time period 4 to 5 hours to afford TEMPO mediated oxidation of cellulose nanofibers (TO-CNF). Oxalic acid, succinic acid, 1.2.4-Benzenetricarboxylic anhydride, citric acid/HCl mixture can be used in step (ba) instead of given mixture.

In still another preferred embodiment, a process for preparation of 4-(3-hydroxypropyl)-2-methoxyphenol from eugenol of step (c) further comprising the steps of:

I. adding borane dimethylsulfide ($BH_3$—$SMe_2$) or $BH_3$ into solution of eugenol in solvent preferably tetrahydrofuran (THF); stirring the resulting mixture at a temperature of 0° C. to −5° C. for the time period 1 to 2 hours and further stirring the reaction mixture at a temperature of 25° C. to 30° C. for the time period ranging from 1 to 2 hours to form reaction mixture;

II. cooling the reaction mixture of step (I) up to 0° C. to −5° C., adding base preferably sodium hydroxide (NaOH) and $H_2O_2$ into reaction mixture followed by stirring the reaction mixture at a temperature of 0° C. to −5° C. for the time period 30 mins to 1 hour and stirring at a temperature of 25° C. to 30° C. for the time period ranging from 1 to 2 hours to afford 4-(3-hydroxypropyl)-2-methoxyphenol.

In yet another preferred embodiment, the step (d) further comprising the steps of:

A. adding 4-Dimethylaminopyridine (DMAP) or triethyl amine or diisopropylethyl amine and 4-(3-hydroxypropyl)-2-methoxyphenol into solution of TO-CNF in solvent preferably dimethyl formamide, cooling the mixture at a temperature of 0° C. to −5° C. to form reaction mixture and B. adding Dicyclohexylcarbodiimide (DCC) to the reaction mixture followed by stirring at a temperature of 0° C. to −5° C. for the time period 30 mins to 1 hour and further stirring at a temperature of 25° C. to 30° C. for the time period ranging from 24 to 26 hours to afford a composite for an edible coatings.

In yet another embodiment, the suitable coupling reagent at step B of step d) process comprises of Dicyclohexylcarbodiimide (DCC), N,N-Carbonyldiimidazole (CDI), 1-Ethyl-3-(3-dimethylaminopropyl)carbodiimide hydrochloride (EDC); 2-(1H-benzotriazole-1-yl)-1,1,3,3-tetramethyluronium tetrafluoroborate (TBTU); 2-(1H-7-azabenzotriazole-1-yl)-1,1,3,3-tetramethyluronium tetrafluoroborate (TATU); 1-[(1-(cyano-2-ethoxy-2-oxoethylideneaminooxy) dimethylaminomorpholinomethylene)]methanaminium, hexafluorophosphate (COMU).

In a further embodiment, Dicyclohexylcarbodiimide (DCC) is used at step B of step d).

In another embodiment, the present invention provides a composite for edible coatings comprising the essential oil modified nanocellulose which shows prolonged antimicrobial effect, preferably antibacterial and antifungal.

In another embodiment, the present invention provides a composite that can form robust transparent coatings on paper, textiles and food products. The composite is bio-derived and non-toxic, can also be used for edible coatings on food products or food packaging. The composite can be used to form antimicrobial films, foams, fibers.

In still another embodiment, the present invention provides a composite for edible coatings comprising a covalently bonded essential oil and cellulose fibres wherein the essential oil does not leach out from the modified cellulose fibres.

In yet another embodiment of the present invention the edible coatings show antimicrobial effect, preferably antibacterial and antifungal.

In still another embodiment, the present invention provides a transparent film comprising the composite for edible coating, wherein the transparent film shows antimicrobial effect, preferably antibacterial and antifungal for a prolonged period.

BRIEF DESCRIPTION OF THE ACCOMPANYING DRAWINGS

FIG. 1: TEM image of cellulose nanofibers

Figure 2:
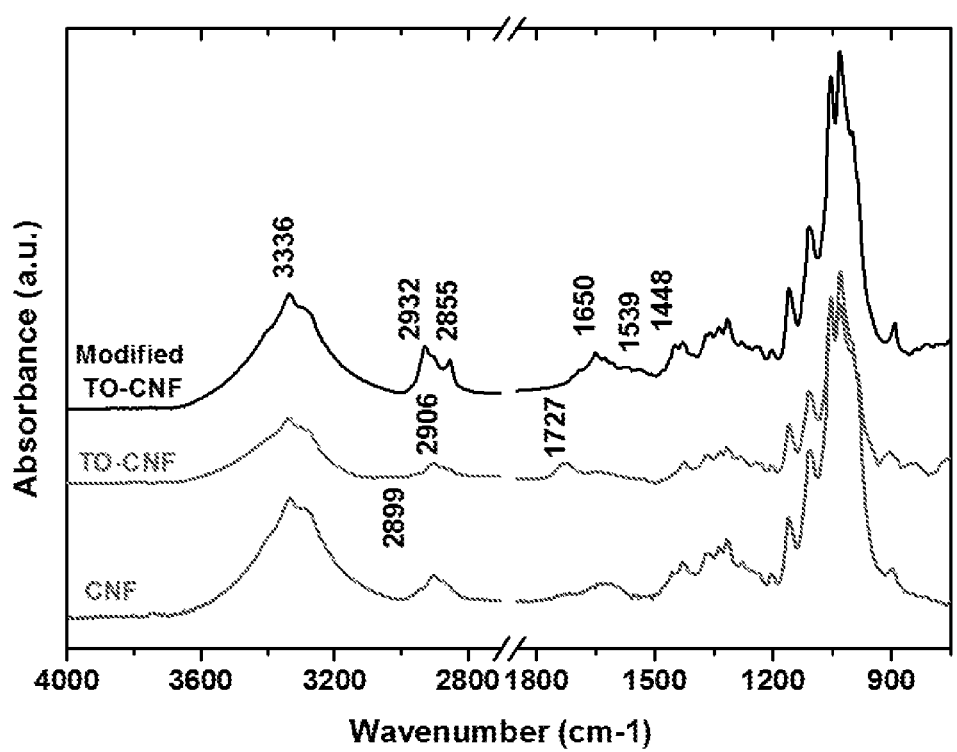

FIG. 2: FTIR date for CNF, TO-CNF and modified TO-CNF

Figure 3:
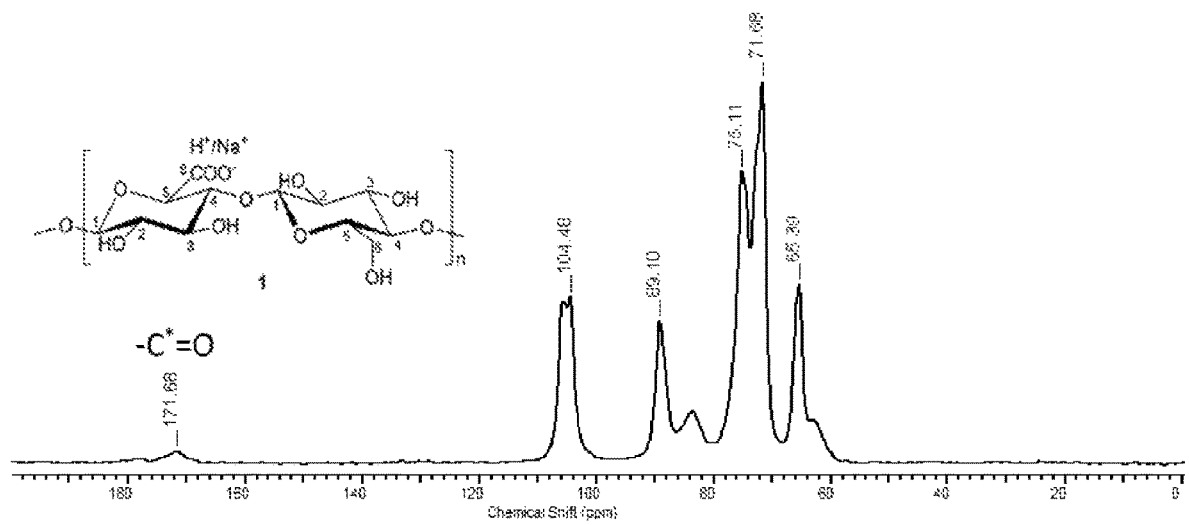

FIG. 3: $^{13}C$ CP/MAS Solid state NMR spectrum for TO-CNF

Figure 4:
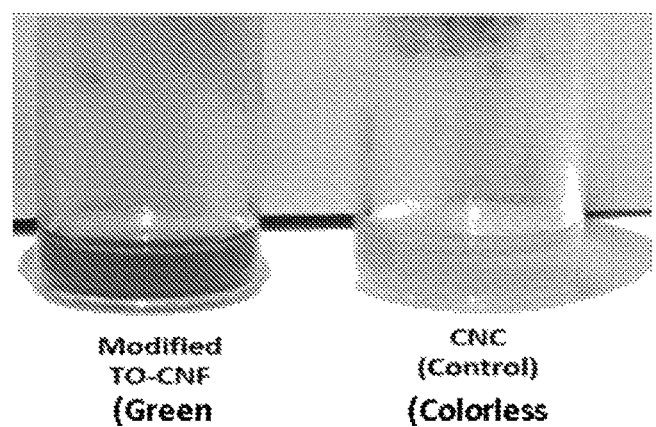

FIG. 4: $FeCl_3$ test for phenol

Figure 5:
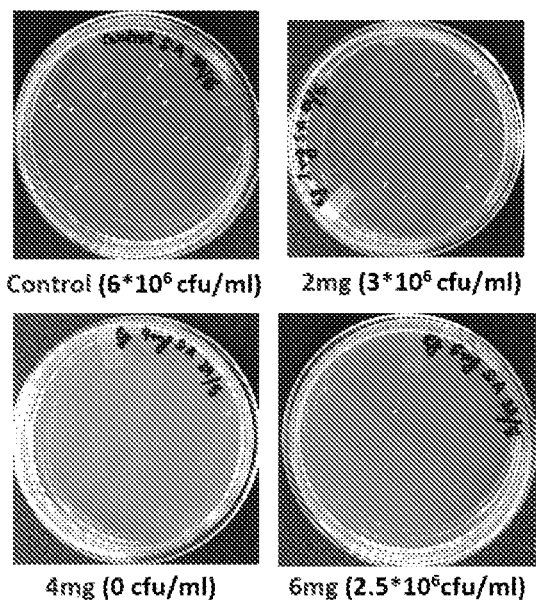

FIG. 5: *Staphylococcus aureus* bacterial growth against eugenol modified TO-CNF.

Figure 6:
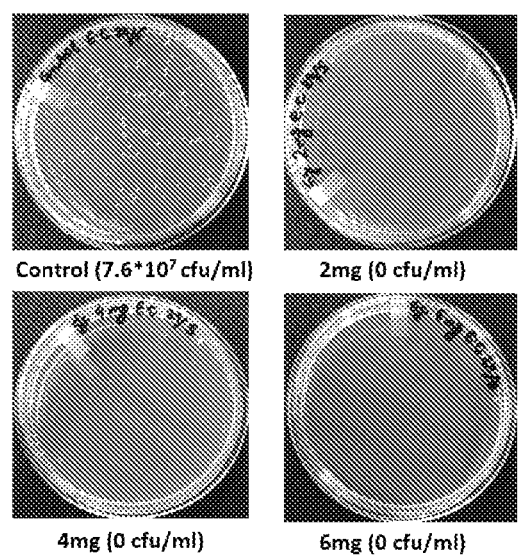

FIG. 6: *E. coli* bacterial growth against eugenol modified TO-CNF.

Figure 7:
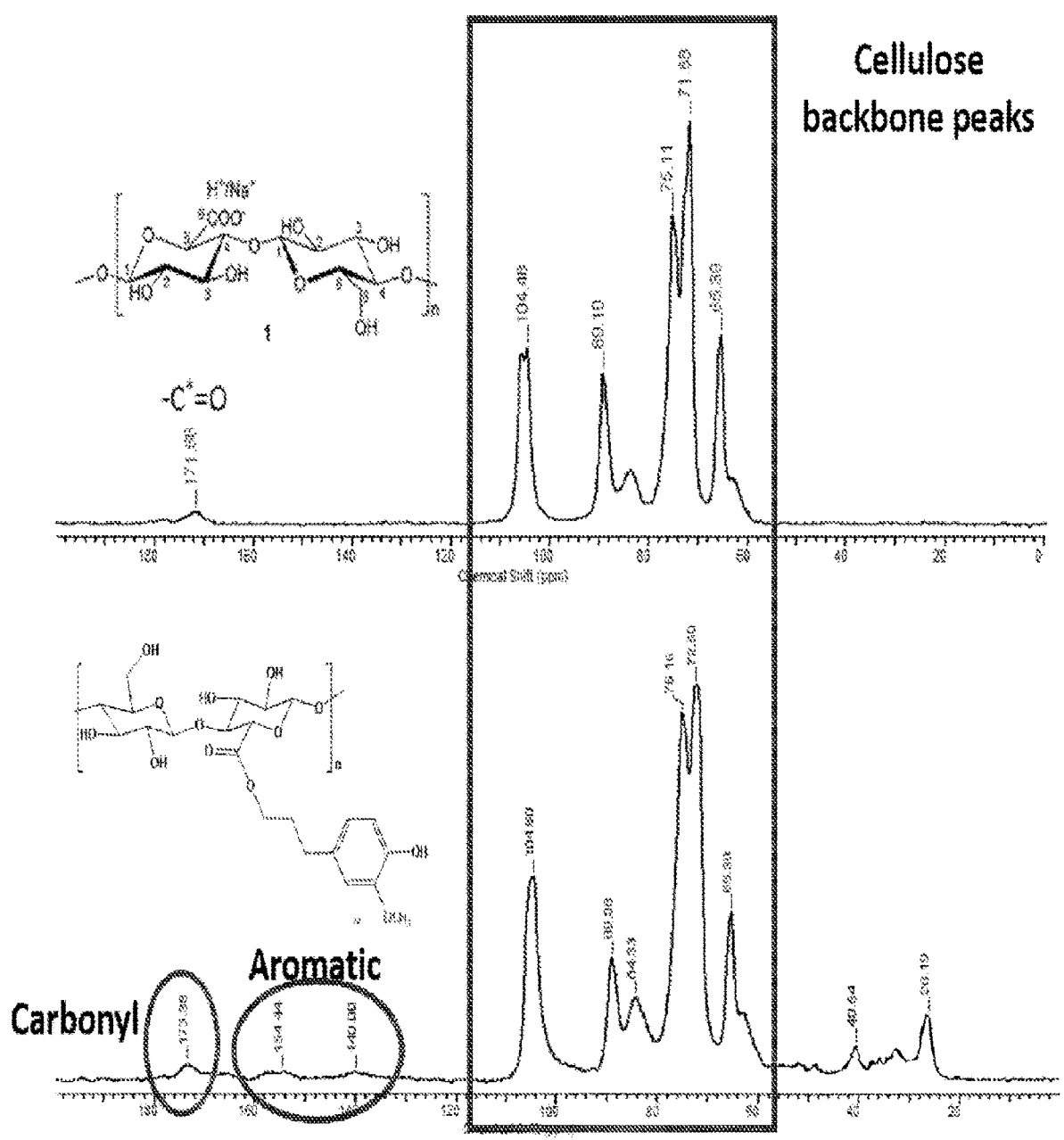

FIG. 7: $^{13}C$ CP/MAS Solid state NMR spectrum of modified TO-CNF.

Figure 8:
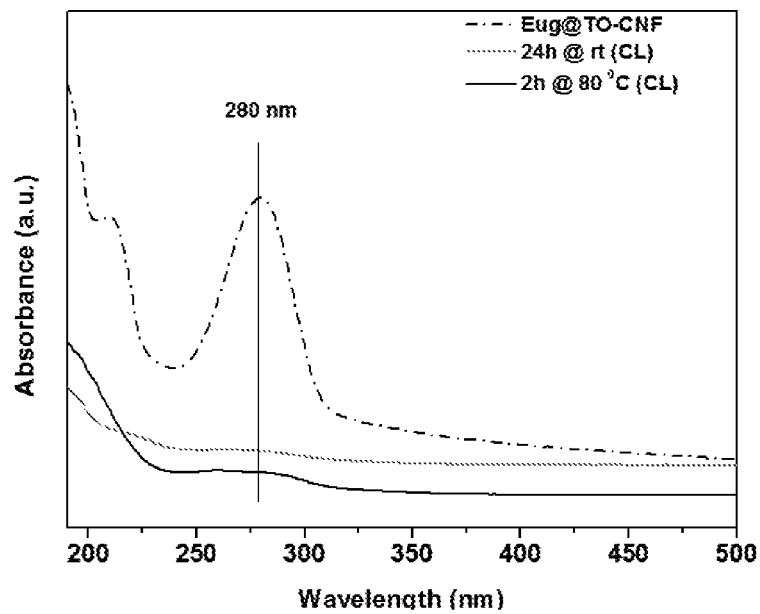

FIG. 8: UV-Vis spectrum of aliquots taken for the coatings in hot (for 1 h) and cold water (24 h) and control (Eug@TO-MCC).

Figure 9:
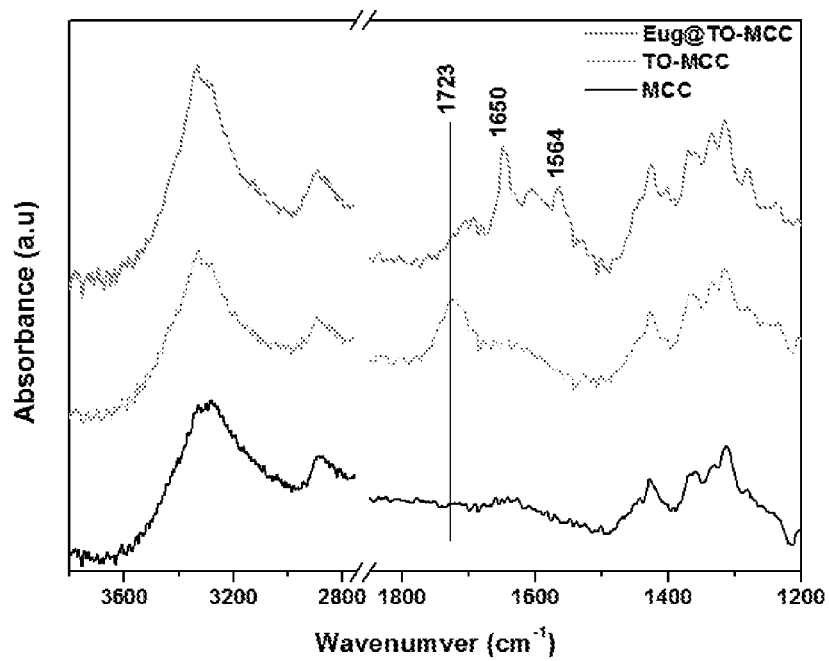

FIG. 9: FTIR of Microcrystalline cellulose (MCC), TEMPO mediated oxidized MCC (TO-MCC) and Eugenol modified TO-MCC (Eug@TO-MCC).

Figure 10:
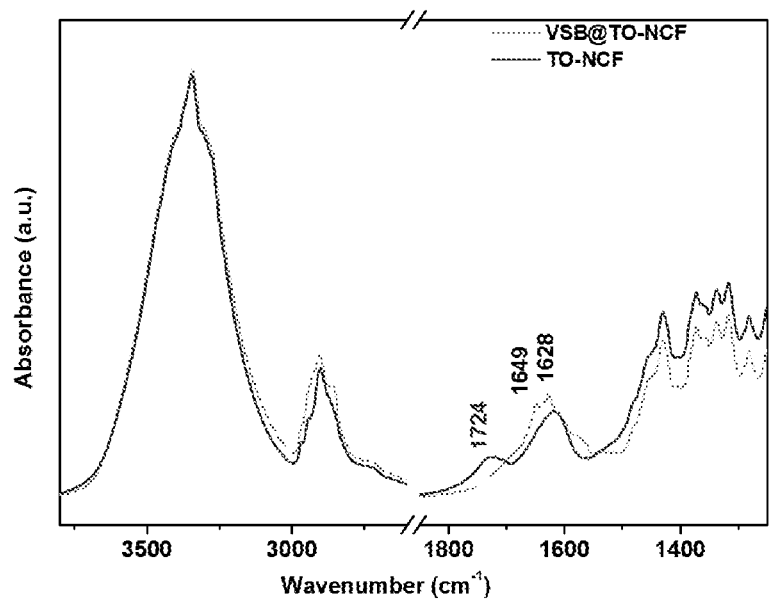

FIG. 10: FTIR showing the modification of TO-CNF (Carboxylated nanocellulose (CNC)) with vanillin schiff base where peaks appearing at 1626 cm-1 corresponds to benzene ring stretching and disappearance of carbonyl peak of TO-CNF confirms the modification.

Figure 11:
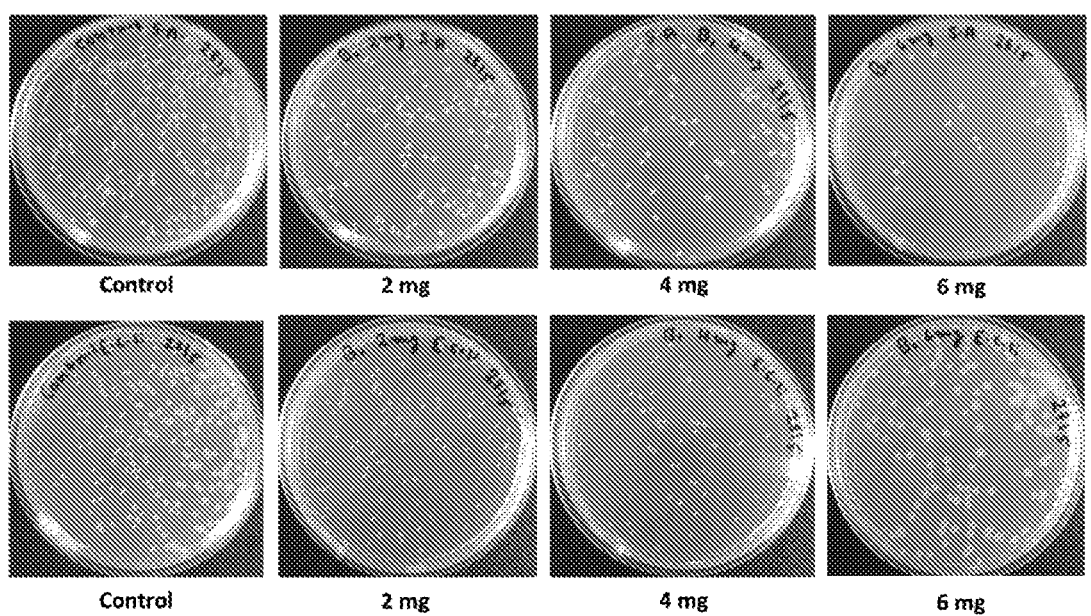

FIG. 11: Bacterial growth of *S. aureus* and *E. coli* respectively against vanillin Schiff's base modified TO-CNF.

DETAILED DESCRIPTION OF THE INVENTION

The invention will now be described in detail in connection with certain preferred and optional embodiments, so that various aspects thereof may be more fully understood and appreciated.

The essential oils used in the invention were eugenic acid (eugenol), caffeic acid, sinapic acid, tannic acid, ferulic acid or p-coumaric acid and vanillin were procured from Ms. Sigma Aldrich Chemicals Pvt Ltd, USA.

The cotton rags used in the invention were procured from Chandra Prakash & Co., Chandra Prakash (Managing Director), No. 1139, Mishra Raja Ji Ka Rasta Chandpole Bazar, Jaipur-302001, Rajasthan, India.

The present invention provides a process for the preparation of essential oil modified nanocellulose and applications thereof. The invention further provides a process wherein the essential oil is covalently bonded with the nanocellulose such that the essential oil does not leach out. The edible coatings comprising the developed essential oil modified nanocellulose thus exhibit a prolonged antimicrobial effect.

The present invention further provides a composite for edible coatings comprising the essential oil modified nanocellulose as obtained by the developed process, wherein the composite shows antimicrobial effect and the essential oil does not leach out from the nanocellulose. The essential oil is chemically anchored to nanocellulose. The antimicrobial essential oil is chemically modified and reacted with nanocellulose. The antimicrobial agent cannot leach out and hence the antimicrobial effect can be long lasting.

In an aspect, the present invention provides a process for preparation of essential oil modified nanocellulose comprising the steps of:
a) preparing cellulose nanofibers;
b) oxidizing cellulose nanofibers by using TEMPO mediated oxidation to afford TO-CNF;
c) preparing 4-(3-hydroxypropyl)-2-methoxyphenol from eugenol; and
d) reacting TO-CNF with 4-(3-hydroxypropyl)-2-methoxyphenol to afford a composite for an edible coatings.

Accordingly, the present invention provides a process for the preparation of essential oil modified nanocellulose wherein the steps comprising:
a) treating cotton rag with a base at a temperature in the range of 70-90 degree C. for a time period in the range of 2 to 4 hours to form alkali treated cotton rag;
b) subjecting bleaching treatment on the cotton rag of step (a) by using acetate buffer and sodium hypochlorite or hydrogen peroxide at a temperature in the range of 70-90 degree C. for a period of 2 hours; repeating the process for 2 to 3 times to make the fibers white and washing with distilled water until pH becomes neutral to form washed bleached pulp;
c) grinding the pulp obtained in step (b) to form cellulose nanofibers (CNF);
d) dispersing the cellulose nanofibers obtained in step (c) in water to form suspension;
e) adding 2,2,6,6 tetramethyl-1-piperidinyloxy (TEMPO), sodium bromide (NaBr) and sodium hypochlorite into suspension of step (d), adjusting the pH of the reaction mixture to 10-11 followed by stirring at a temperature of 30 degree C. for the time period of 4 to 5 hours to obtain TEMPO oxidized cellulose nanofibers (TO-CNF);
f) adding borane dimethylsulfide ($BH_3$-$SMe_2$) or $BH_3$ into essential oil solution in solvent preferably tetrahydrofuran (THF); stirring the resulting mixture at a temperature of 0 to minus 5 degree C. for a period of 1 to 2 hours and further stirring the reaction mixture at a temperature of 25 to 30 degree C. for a period ranging from 1 to 2 hours to form reaction mixture;
g) cooling the reaction mixture of step (f) to a temperature in the range of 0 to minus 5 degree C., adding the base sodium hydroxide (NaOH) and $H_2O_2$ into reaction mixture followed by stirring the reaction mixture at a temperature in the range of 0 to minus 5 degree C. for a period of 30 min to 1 hour and stirring at a temperature of 25 to 30 degree C. for a period ranging from 1 to 2 hours to obtain 4-(3-hydroxypropyl)-2-methoxyphenol;
h) adding 4-Dimethylaminopyridine (DMAP) or triethyl amine or diisopropylethyl amine and 4-(3-hydroxypropyl)-2-methoxyphenol into solution of TO-CNF as obtained in step (e) in solvent dimethyl formamide followed by cooling the mixture at a temperature in the range of 0 to minus 5 degree C. to form reaction mixture;
i) adding the coupling reagent Dicyclohexylcarbodiimide (DCC) to the reaction mixture obtained in step (h) followed by stirring at a temperature of 0 to minus 5 degree C. for a period of 30 min to 1 hour and further stirring at a temperature in the range of 25 to 30 degree C. for a period ranging from 24 to 26 hours to obtain the desired essential oil modified nanocellulose.

In an aspect, the present invention provides a process wherein the essential oil is selected from the group consisting of eugenic acid (eugenol), caffeic acid, sinapic acid, tannic acid, ferulic acid or p-coumaric acid and vanillin.

In another aspect, the present invention provides a process wherein the base is sodium hydroxide.

In still another aspect, the present invention provides a process wherein the ratio of nanocellulose to essential oil during modification reaction is 1:5 equivalents and is kept constant.

In yet another aspect, the present invention provides a composite for edible coatings comprising the essential oil modified nanocellulose as obtained by the developed process, wherein the composite shows antimicrobial effect and the essential oil does not leach out from the nanocellulose.

In still another aspect, the present invention provides a process wherein the nanocellulose fibres may be replaced with microcrystalline cellulose, nanocrystalline cellulose or carboxylated nanocellulose.

In another aspect of the present invention the essential oil modified nanocellulose is useful to make a composite for edible coatings that can be prepared by dispersing the modified TO-CNF in water using stirring and sonication and then it can be spread over a piece of paper using glass rod, dried in oven at 50 degree C. for 6 hours. Coating can be done on both sides of paper.

In yet another aspect of the present invention the composite for edible coatings exhibit antimicrobial effect, preferably antibacterial and antifungal. The composite can form robust transparent coatings on paper, textiles and food products. The composite is biodegradable and non-toxic, can also be used for edible coatings on food products or food packaging. The composite can be used to form antimicrobial films, foams, fibers.

TEM confirms the formation of nanofibrils with a diameter of nanofibers in the range of 10-50 nm as shown in FIG. 1.

Cellulose nanofibers preparation is confirmed using FTIR where characteristic peaks for cellulose are seen, i.e. 3336 $cm^{-1}$ for —OH symmetric stretching, 2900 $cm^{-1}$ for —CH symmetric stretching, 1649 $cm^{-1}$ for hydrogen bonding due to the presence of moisture confirm the synthesis of nanocellulose free from lignin and hemicellulose as shown in FIG. 2. TO-CNF is characterized using FTIR where a peak appearing at 1727 $cm^{-1}$ corresponds to the carbonyl of carboxylic group as shown in FIG. 2.

Finally, the reaction of TO-CNF with 4-(3-hydroxypropyl)-2-methoxyphenol is monitored using FTIR where peak 1727 $cm^{-1}$ gets disappeared due to the formation of ester bond along with the appearance of a peak 1539 $cm^{-1}$ and 1448 $cm^{-1}$ corresponds to benzene ring stretching as depicted in FIG. 2.

Also, $^{13}$C-CPMAS solid-state NMR peak appearing at 171 ppm correspond to the carbonyl carbon as shown in FIG. 3. Quantification of the carboxylic group is done using conductometric titration and is found to have 788 mmol/kg carboxylic conversion. Also, in $^{13}$C-CPMAS the peak shift from 171 ppm to 173 ppm due to the formation of ester bond along with the appearance of the peak at 140 ppm as shown in FIG. 3 corresponding to the aromatic carbons of eugenol.

Chemical test for phenol (FeCl$_3$ test) is performed using TO-CNF as a control, where the product has shown positive test which is determined with the appearance of green color as depicted in FIG. 4 due to the formation of complex of $Fe^{3+}$ with the phenol attached to TO-CNF.

Antibacterial test with different amounts of essential oil modified nanocellulose coating has shown that 4 mg is required to exhibit broad spectrum bactericidal effect, wherein the 4 mg sample has shown 100% killing of both gram positive (*Staplylococcus aureus*) (0 cfu/ml) as shown by FIG. 5 and gram negative (*E. coli*) (0 cfu/ml) by FIG. 6 bacterial strains compared to control where there is a persistent growth of bacteria with 6*10$^6$ cfu/ml and 7.6*10$^7$ cfu/ml against *S. aureus* and *E. coli* respectively. The microorganisms *Staplylococcus aureus* and *E. coli* are recurrent lab strains available at NCIM, NCL, Pune, India.

TABLE 1

*S. aureus* bacterial growth inhibition with the use of essential oil modified nanocellulose coating

|  | Control | 2 mg | 4 mg | 6 mg |
| --- | --- | --- | --- | --- |
| CFU/ml | 6*10$^6$ | 3*10$^6$ | 0 | 2.5*10$^6$ |
| % reduction w.r.t. control |  | 50% | 100% | 95.8% |

TABLE 2

*E. coli* bacterial growth inhibition with the use of essential oil modified nanocellulose coating

|  | Control | 2 mg | 4 mg | 6 mg |
| --- | --- | --- | --- | --- |
| CFU/ml | 7*10$^7$ | 0 | 0 | 0 |
| % reduction w.r.t. control |  | 100% | 100% | 100% |

FIG. 7 depicts the $^{13}$C solid state CP/MAS NMR of TO-CNF and Eugenol modified TO-CNF to show the covalent linkage of Eugenol to nanocellulose. Preparation of 4-(3-hydroxypropyl)-2-methoxyphenol is confirmed using $^1$H-NMR (200 MHz, CDCl3), where peaks appearing at 6.83 (d, J=7.8 Hz, 1H), 6.71-6.67 (m, 2H), 3.86 (s, 3H), 3.67 (t, J=6.4 Hz, 2H), 2.64 (t, J=8.0 Hz, 2H), 2.06 (bs, 1H), 1.92-1.82 (m, 2H). $^{13}$C NMR (200 MHz, CDCl$_3$): 146.5, 143.7, 133.8, 120.9, 114.4, 111.1, 62.2, 55.9, 34.4, 31.7 ppm. Also, the peak appearing at 182 m/z value in mass spectroscopy confirms the product formation.

The essential oil modified nanocellulose is coated on paper and dipped in cold water at room temperature (25-30° C.) and hot water (80° C.) to check for leaching. Results show that there is no or negligible peak related to essential oil from the composite. FIG. 8 depicts UV-V spectrum of aliquots which is taken for the coatings in hot (for 2 h) and cold water (24 h) and control (Eug @TO-MCC).

FIG. 9 shows FTIR of Microcrystalline cellulose (MCC), TEMPO mediated oxidized MCC (TO-MCC) and Eugenol modified TO-MCC (Eug @TO-MCC). IR band appearing at 1723 cm$^{-1}$ in TO-MCC confirms the TEMPO mediated oxidation which upon reacting with modified eugenol disappears and bands appearing between 1650 and 1564 cm$^{-1}$ corresponds to benzene ring stretching confirms the modification of TO-MCC with eugenol.

FIG. 10 shows FTIR showing the modification of TO-CNF (Carboxylated nanocellulose (CNC)) with vanillin schiffs base where peaks appearing at 1626 cm$^{-1}$ correspond to benzene ring stretching and disappearance of carbonyl peak of TO-CNF confirms the modification.

Table 3 summarises results of percentage reduction of bacterial strains using Vanillin Schiff base modified TO-CNF.

TABLE 3

|  | 2 mg | 4 mg | 6 mg |
| --- | --- | --- | --- |
| *E. Coli* | 61.47% | 79.19% | 71.14% |
| *S. Aureus* | 44.44% | 66.67% | 92.78% |

FIG. 11 shows Bacterial growth of *S. Aureus* and *E. Coli* respectively.

General Information

KBR pellets were prepared using the standard procedure, and FTIR spectrum was acquired using Perkin Elmer Q5000 GX IR instrument to acquire the data of the final product. $^1$H-NMR and $^{13}$C-NMR were obtained in solution for reactants and solid state for TOCNF and final product using 200 MHz spectrometer. Samples were prepared using the standard procedure. Samples were prepared by dissolving product (10 mM) in a volatile solvent (here ethyl acetate) and injecting it into the GC-MS instrument to obtain the mass-to-charge ratio (m/z). Samples were prepared for TEM by dispersing it into the water, diluted to a concentration of 0.01 w/v % in and immediately drop cast onto TEM grids. The grids were subjected to vacuum drying at 60° C., −720 mm Hg for 24 hr. Images were obtained using transmission electron microscope (Technai T-20) at an accelerating voltage of 200 kV. Chemical test for phenols (FeCl$_3$ test). In brief, 20 mg of modified TO-CNF was suspended in dichloromethane, added 3-5 drops of a 1% ferric chloride in methylene chloride. To this mixture, added a drop of pyridine and stirred it for an hour and change in color was noticed to characterize the phenol. Conductometric titration was done to quantify the carboxylic group conversion using following procedure. In short, 10 mL of TO-CNF dispersion in water with a concentration of 5 mg/mL was added to 80 mL of deionized water and the dispersion was stirred. Conductivity probes were calibrated with standards. The probes were inserted into the TO-CNF dispersion. 50 μL of 12 N HCl was added to the TO-CNF water suspension which precipitated the whiskers. To neutralize the acid groups, 0.5M NaOH solution was added in steps of 50 μL and the conductivity of the solution was continuously recorded to determine the endpoint. Charge density can be determined using the following formula:

$$\text{Charge density}\left(\frac{\text{mmol}}{\text{kg}}\right) = \frac{\text{volume of NaOH (ml)} \times 0.5}{(1000 \times \text{mg of whiskers} \times 10 - 6)}$$

EXAMPLES

The following examples are given by way of illustration only and therefore should not be construed to limit the scope of the present invention in any manner.

Example 1: Preparation of Cellulose Nanofibers (Cotton Rag)

The 50 g cotton rag was cut into small pieces and clean with distilled water and then treated with 10% NaOH at 80° C. for 2 hours and washed with distilled water. After alkali treatment cotton rag was bleached by using equal proportion of acetate buffer and 1.5% sodium hypochlorite at 80° C. for 2 hours. The process was repeated 2 times (depending on the softness of the fibers) till fiber became white and washed with distilled water until its pH becomes neutral. The washed bleached pulp was ground with the help of ultra-friction micro grinder. Initially, the pulp was passed 10 times through the 50-micron gap between the two-grinding stone. The same process was repeated for the different gap to obtain fibers of diameter in the range of nanometer. CNF was characterized using TEM and FTIR.

Example 2: TEMPO Mediated Oxidation of Cellulose Nanofibers (TO-CNF)

Carboxylation of cellulose nanofibers (CNF) was done using the following protocol. 5 g CNF was dispersed in deionized water with a final concentration of 10 mg/ml. To this suspension added 0.5 g of 2,2,6,6 tetramethyl-1-piperidinyloxy (TEMPO) and 5 g of sodium bromide (NaBr) and stirred for few minutes at 30° C. until TEMPO and NaBr are dissolved. The oxidation was started by adding 25 w/w % sodium hypochlorite (NaClO) w.r.t. the dry weight of NCF. i.e. 31.25 ml of 4 w/v % NaClO solution (1.25 g) to the above reaction mixture. The pH was adjusted to 10-11 using 3N NaOH solution and left for stirring for another 4 hours at ambient conditions. After completion of the reaction, 30 g sodium chloride (NaCl) was added to precipitate the cellulose suspension. The product was then separated using centrifugation techniques and further washed with 1.0 M NaCl solution and 0.1 M HCl solution at least thrice using a centrifuge. Finally, the product was dispersed in deionized water and kept for dialysis using cellulose tubing membrane in deionized water for 3 days and the product was finally lyophilized using labconco lyophilizer to get aerogel. TO-CNF was characterized using $^{13}$C-CPMAS solid-state NMR and FTIR.

Example 3: Another Method of Modification of Carboxylated Nanocellulose (OACNC) by Oxalic Acid Cellulose suspension (20 mg/ml) were prepared from Whatman No. 1 filter paper combined with 100 mL of DI water and blended at high speed until a lumpy pulp was formed which was homogenized to form a fine homogenous pulp. Added, 70 g of oxalic acid into this dispersion, which was kept in an oil bath at 100° C. and continue reaction for 4 h. After 4 h, quenches the reaction mixture by pouring 100 ml of DI water at temperature of 80° C. Finally, the reaction mixture is filtered and washed with DI water until the pH is neutral.

Charge density (mmol/kg)=500-600 mmol/kg (using conductometric titrations)

Thermal stability=200° C., yield=80-90%.

Example 4: Preparation of 4-(3-hydroxypropyl)-2-methoxyphenol from Eugenol 4-(3-hydroxypropyl)-2-methoxyphenol was prepared using the reported procedure. In brief, took eugenol (2.00 g, 12.18 mmol, 1 eq) in dry THF (35 ml) at 0° C. To this added BH$_3$.SMe$_2$ (2.30 ml, 24.36 mmol, 2 eq.) dropwise in 30 mins under a nitrogen atmosphere. The resulting mixture was stirred at 0° C. for one hour and one hour at 30° C. After one hour, the reaction mixture was cooled down to 0° C., added 1 molar solution of NaOH (30 ml, 30.90 mmol, 2.50 eq) dropwise. Thereafter, 30% H$_2$O$_2$ (35 ml) was added dropwise, left for stirring at 0° C. for another 30 min and 1 hour at room temperature. The aqueous layer was extracted with diethyl ether; combined organic phase was washed with brine, dried over sodium sulfate, filtered and concentrated over reduced pressure. The desired product was purified using column chromatography by using 40:60 (ethyl acetate: pet ether) eluent to obtain an inseparable mixture containing both 1° (4-(3-hydroxypropyl)-2-methoxyphenol) and 2° (4-(2-hydroxypropyl)-2-methoxyphenol) alcohol and characterized using $^1$H NMR, $^{13}$C NMR.

$^1$H-NMR (200 MHz, CDCl3), where peaks appearing at 6.83 (d, J=7.8 Hz, 1H), 6.71-6.67 (m, 2H), 3.86 (s, 3H), 3.67 (t, J=6.4 Hz, 2H), 2.64 (t, J=8.0 Hz, 2H), 2.06 (bs, 1H), 1.92-1.82 (m, 2H). $^{13}$C NMR (200 MHz, CDCl$_3$): 146.5, 143.7, 133.8, 120.9, 114.4, 111.1, 62.2, 55.9, 34.4, 31.7 ppm confirms the preparation of the product.

Example 5: Reaction of TO-CNF with 4-(3-hydroxypropyl)-2-methoxyphenol

TO-CNF was modified with eugenol using esterification reaction via following reported procedure with slight modification. In brief, TO-CNF (1 g, 0.788 mmol concerning carboxylic groups) was dispersed in dry DMF purged with nitrogen gas. To it added, DMAP (193 mg, 1.576 mmol) and 4-(3-hydroxypropyl)-2-methoxyphenol (0.717 g, 3.94 mmol) and let it stir for another 10 min, cooled to 0° C. Finally, added DCC (1.298 g, 6.304 mmol) to the reaction mixture, stirred for another 30 mins 0° C. The reaction mixture was stirred for another 24 h at 27° C. After completion of 24 h, the product was recovered using centrifugation technique and later washed with deionized water thrice and lyophilized to obtained aerogel. Final product was characterized using $^{13}$C-CPMAS solid-state NMR where the peak shift from 171 ppm to 173 ppm due to the formation of ester bond along with the appearance of the peak at 140 ppm (FIG. 3) corresponding to the aromatic carbons of eugenol. FTIR where band peak at 1727 cm$^{-1}$ gets disappeared due to the formation of ester bond along with the appearance of a peak 1539 cm$^{-1}$ and 1448 cm$^{-1}$ corresponds to benzene ring stretching (FIG. 2) and by chemical test method for phenol where the product has shown positive test which is determined with the appearance of green color (FIG. 4) due to the formation of complex of Fe$^{3+}$ with the phenol attached to TO-CNF.

Example 6: Modification of TO-CNF by Using Vanillin as an Essential Oil (Reference: Molecular Crystals and Liquid Crystals, 2008, 490, 106-123.)

Vanillin and p-anisidine were mixed together in 1:1 molar ratio in a glass tube and melted in an oil bath at 135° C. The melt was cooled in an ice bath. The solidified mass was crushed into a fine powder. The process of melting, cooling, and crushing was repeated 2 or 3 times to ensure yield of the product. (Vanillin Schiff base was synthesized using solid state solvent free synthesis and further reacted with TO-CNF by the same process of Example 5).

Example 7: Antibacterial Tests

Cellulose nanofibers are used which are obtained from waste cotton rag, treated with alkali, bleached and finally mechanically grinded using super mass collider.

The antibacterial properties of cellulose and modified TOCNF were evaluated by ASTM E2149 standard test method, a quantitative antimicrobial test method performed under dynamic contact conditions. Samples were taken in three different amounts i.e. 2, 4 and 6 mg and were tested against both gram-positive (*Staphylococcus aureus*) (NCIM 2079; ATCC 6538) and gram-negative (*Escherichia coli*) bacterial culture (NCIM 2065; ATCC 8739). The incubated test culture in a nutrient broth was diluted (serial diluted) with a sterilized 0.3 mM phosphate buffer (pH 7.2) to give a final concentration of $5 \times 10^3$ colony forming unit (CFU)/ml. This solution was used as a working bacterial dilution. Fibre samples (20 mg) were transferred to a 250 ml Erlenmeyer flask containing 50 ml of the working bacterial dilution. All flasks were capped loosely (capped with cotton plug), placed on the incubator, and shaken for 22 h at 37° C. and 120 rpm using an incubator shaker. After a series of dilutions of the bacterial solutions using the buffer solution, 20 µL of the dilution was plated in nutrient agar (inoculated in nutrient agar petri dishes). The inoculated plates were incubated at 37° C. for overnight and surviving cells were counted. The average values of the duplicates were converted to CFU/ml in the flasks by multiplying by the dilution factor. The antimicrobial activity was expressed in terms of % reduction of the organism after contact with the test specimen compared to the number of bacterial cells surviving after contact with the control. The percentage reduction was calculated using the following equation, $$\% \text{ Reduction} = 100 \times \frac{B - A}{B}$$

Where A and B are the surviving cells (CFU/ml) for the flasks containing test samples (modified TO-CNF) and the control (blank cellulose fibers), respectively, after 22 h contact time.

Advantages of the Invention

Process of the invention provides covalent linkage between essential oil and nanocellulose wherein the essential oil does not leach out.
Antimicrobial effect of the developed essential oil modified nanocellulose will be long lasting.
Products are biodegradable and non-toxic.
Coatings prepared from the developed essential oil modified nanocellulose are transparent.

The invention claimed is:

1. A process for the preparation of essential oil modified nanocellulose, comprising the steps of:
   a) treating cotton rag with a base at a temperature in the range of 70-90 degree C. for a time period in the range of 2 to 4 hours to form alkali treated cotton rag;
   b) subjecting bleaching treatment on the cotton rag of step (a) by using acetate buffer and sodium hypochlorite or hydrogen peroxide at a temperature in the range of 70-90 degree C. for a period of 2 hours; repeating steps a)-b) for 2 to 3 times to make the fibers white and washing with distilled water until pH becomes neutral to form washed bleached pulp;
   c) grinding the pulp obtained in step (b) to form cellulose nanofibers (CNF);
   d) dispersing the cellulose nanofibers obtained in step (c) in water to form a suspension;
   e) adding 2,2,6,6 tetramethyl-1-piperidinyloxy (TEMPO), sodium bromide (NaBr) and sodium hypochlorite into the suspension of step (d) to form a first reaction mixture, adjusting the pH of the first reaction mixture to 10-11 followed by stirring at a temperature of 30 degree C. for the time period of 4 to 5 hours to obtain a solution of TEMPO oxidized cellulose nanofibers (TO-CNF);
   f) adding borane dimethylsulfide ($BH_3$-$SMe_2$) or $BH_3$ into a eugenol solution in solvent to form a second reaction mixture; stirring the second reaction mixture at a temperature of 0 to minus 5 degree C. for a period of 1 to 2 hours and further stirring the second reaction mixture at a temperature of 25 to 30 degree C. for a period ranging from 1 to 2 hours;
   g) cooling the second reaction mixture of step (f) to a temperature in the range of 0 to minus 5 degree C., adding sodium hydroxide (NaOH) and $H_2O_2$ into the second reaction mixture to form a third reaction mixture followed by stirring the third reaction mixture at a temperature in the range of 0 to minus 5 degree C. for a period of 30 min to 1 hour and stirring at a temperature of 25 to 30 degree C. for a period ranging from 1 to 2 hours to obtain 4-(3-hydroxypropyl)-2-methoxyphenol;
   h) adding 4-Dimethylaminopyridine (DMAP) or triethyl amine or diisopropylethyl amine and 4-(3-hydroxypropyl)-2-methoxyphenol into the solution of TO-CNF as obtained in step (e) in solvent dimethyl formamide followed by cooling the mixture at a temperature in the range of 0 to minus 5 degree C. to form a fourth reaction mixture;
   i) adding the coupling reagent Dicyclohexylcarbodiimide (DCC) to the fourth reaction mixture obtained in step (h) followed by stirring at a temperature of 0 to minus 5 degree C. for a period of 30 min to 1 hour and further stirring at a temperature in the range of 25 to 30 degree C. for a period ranging from 24 to 26 hours to obtain the desired essential oil modified nanocellulose.

2. The process as claimed in claim 1, wherein the base is sodium hydroxide.

3. The process as claimed in claim 1, wherein the ratio of nanocellulose to eugenol during modification reaction is 1:5 equivalents and is kept constant.

4. The process of claim 1, wherein the solvent is tetrahydrofuran (THF).

5. A composite for edible coatings comprising the essential oil modified nanocellulose as obtained by the process as claimed in claim 1, wherein the composite shows antimicrobial effect.

* * * * *